(12) United States Patent
Yamada et al.

(10) Patent No.: US 11,752,630 B2
(45) Date of Patent: Sep. 12, 2023

(54) SPEED CONTROL METHOD FOR ROBOT TO WHICH ONE OF A PLURALITY OF END EFFECTORS IS DETACHABLY ATTACHABLE AND ROBOT SYSTEM INCLUDING ROBOT TO WHICH ONE OF A PLURALITY OF END EFFECTORS IS DETACHABLY ATTACHABLE

(71) Applicant: SEIKO EPSON CORPORATION, Tokyo (JP)

(72) Inventors: Yoshihito Yamada, Chino (JP); Hirofumi Kinoshita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 229 days.

(21) Appl. No.: 17/105,526

(22) Filed: Nov. 26, 2020

(65) Prior Publication Data
US 2021/0154838 A1    May 27, 2021

(30) Foreign Application Priority Data

Nov. 27, 2019   (JP) ................. 2019-214668

(51) Int. Cl.
| | | |
|---|---|---|
| B25J 9/16 | (2006.01) | |
| B25J 13/08 | (2006.01) | |
| B25J 15/04 | (2006.01) | |

(52) U.S. Cl.
CPC .......... *B25J 9/1674* (2013.01); *B25J 9/1602* (2013.01); *B25J 9/1664* (2013.01); *B25J 13/088* (2013.01); *B25J 15/04* (2013.01); *G05B 2219/39468* (2013.01)

(58) Field of Classification Search
CPC ...... B25J 9/1674; B25J 9/1602; B25J 9/1664; B25J 13/088; B25J 15/04; B25J 9/1612; B25J 19/0095; G05B 2219/39468
See application file for complete search history.

(56) References Cited

U.S. PATENT DOCUMENTS

| | | | | |
|---|---|---|---|---|
| 6,208,105 | B1 * | 3/2001 | Kato ................. | B25J 9/1674 318/567 |
| 2009/0326552 | A1 * | 12/2009 | Diolaiti ............. | A61B 90/10 606/130 |
| 2016/0026751 | A1 * | 1/2016 | Walther ............ | G06F 30/17 703/13 |

(Continued)

FOREIGN PATENT DOCUMENTS

| | | |
|---|---|---|
| JP | H06344285 A | 12/1994 |
| JP | 2010167515 A | 8/2010 |

*Primary Examiner* — Abby Y Lin
*Assistant Examiner* — Karston G. Evans
(74) *Attorney, Agent, or Firm* — Gang Yu

(57) ABSTRACT

A control method includes an acquiring step for acquiring information concerning a plurality of end effectors and acquiring an operation program, and a driving step for driving a robot arm based on the operation program acquired in the acquiring step, wherein in the driving step, speed of a speed estimation target part is calculated, for each of the plurality of end effectors based on a detection result of the detecting section, and when it is determined that, in a result of the calculation, speed of the speed estimation target part moving at highest speed when the robot arm is driven by the operation program is equal to or higher than predetermined speed, operating speed of the robot arm is reduced.

7 Claims, 9 Drawing Sheets

(56) References Cited

U.S. PATENT DOCUMENTS

2017/0269574 A1* 9/2017 Oumi ............... G05B 19/4097
2018/0361591 A1* 12/2018 Okamoto ............... B25J 9/1602
2021/0045827 A1* 2/2021 Asadian ............... A61B 90/06

* cited by examiner

OPERATION PROGRAM 1

OPERATION PROGRAM 1

OPERATION PROGRAM 1

OPERATION PROGRAM 2

SPEED CONTROL METHOD FOR ROBOT TO WHICH ONE OF A PLURALITY OF END EFFECTORS IS DETACHABLY ATTACHABLE AND ROBOT SYSTEM INCLUDING ROBOT TO WHICH ONE OF A PLURALITY OF END EFFECTORS IS DETACHABLY ATTACHABLE

The present application is based on, and claims priority from JP Application Serial Number 2019-214668, filed Nov. 27, 2019, the disclosure of which is hereby incorporated by reference herein in its entirety.

BACKGROUND

1. Technical Field

The present disclosure relates to a control method and a robot system.

2. Related Art

For example, JP-A-6-344285 (Patent Literature 1) discloses a robot including a replacement hand including switching means for performing switching setting corresponding to a type of the replacement hand, a robot main body to which the replacement hand is selectively attached, and robot-main-body controlling means for controlling the robot main body.

In the robot disclosed in Patent Literature 1, the robot-main-body controlling means identifies the type of the replacement hand based on the switching means of the replacement hand attached to the robot main body. Consequently, the robot can recognize which replacement hand is attached. It is possible to improve safety of an operator present around the robot by, for example, feeding back the type of the replacement hand to control of the robot. That is, since the robot can identify, among replacement hands likely to be attached, which replacement hand is attached, it is possible to calculate a portion where operating speed of the attached replacement hand increases. It is possible to secure safety by performing speed monitoring in that portion.

However, a replacement hand not including switching means for identifying a type of the replacement hand is attached to the robot, the robot cannot identify the attached replacement hand and cannot operate based on the attached replacement hand. Therefore, security cannot be secured.

SUMMARY

The present disclosure has been devised in order to solve the problems and can be realized as follows.

A control method according to the present disclosure is a control method for a robot including a robot arm including an arm to which one of a plurality of end effectors is detachably attachable, the robot arm being driven based on an operation program, and a detecting section configured to detect motion of the robot arm. The control method including: an acquiring step for acquiring information concerning the plurality of end effectors and acquiring the operation program; and a driving step for driving the robot arm based on the operation program acquired in the acquiring step. In the driving step, speed of a speed estimation target part is calculated for each of the plurality of end effectors based on a detection result of the detecting section. When it is determined that, in a result of the calculation, speed of the speed estimation target part moving at highest speed when the robot arm is driven by the operation program is equal to or higher than predetermined speed, operating speed of the robot arm is reduced.

A control method according to the present disclosure is a control method for a robot including a robot arm including an arm to which one of a plurality of end effectors is detachably attachable, the robot arm being driven based on an operation program, and a detecting section configured to detect motion of the robot arm. The control method including: an acquiring step for acquiring information concerning the plurality of end effectors and acquiring the operation program; a calculating step for calculating speed of a speed estimation target part for each of the plurality of end effectors based on the information acquired in the acquiring step and calculating, based on a detection result of the detecting section, in a result of the calculation, speed of the speed estimation target part moving at highest speed at time when the robot arm is driven by the operation program; and a driving step for driving the robot arm based on the operation program acquired in the acquiring step. In the driving step, when it is determined that the calculation result is equal to or higher than predetermined speed, operating speed of the robot arm is reduced.

A robot system according to the present disclosure includes: a robot arm including an arm to which one of a plurality of end effectors is detachably attachable, the robot arm being driven based on an operation program; a detecting section configured to detect motion of the robot arm; an acquiring section configured to acquire information concerning the end effectors and acquire the operation program; a calculating section configured to calculate speed of a speed estimation target part for each of the plurality of end effectors based on the information acquired by the acquiring section; a driving control section configured to drive the robot arm based on the operation program; and a comparing section configured to calculate, when the robot arm is driven by the operation program, based on a detection result of the detecting section, speed of the speed estimation target part moving at highest speed and compare a result of the calculation and predetermined speed. When the comparing section determines that the calculation result is equal to or higher than the speed, the driving control section reduces operating speed of the robot arm.

DESCRIPTION OF EXEMPLARY EMBODIMENTS

First Embodiment

Figure 1:
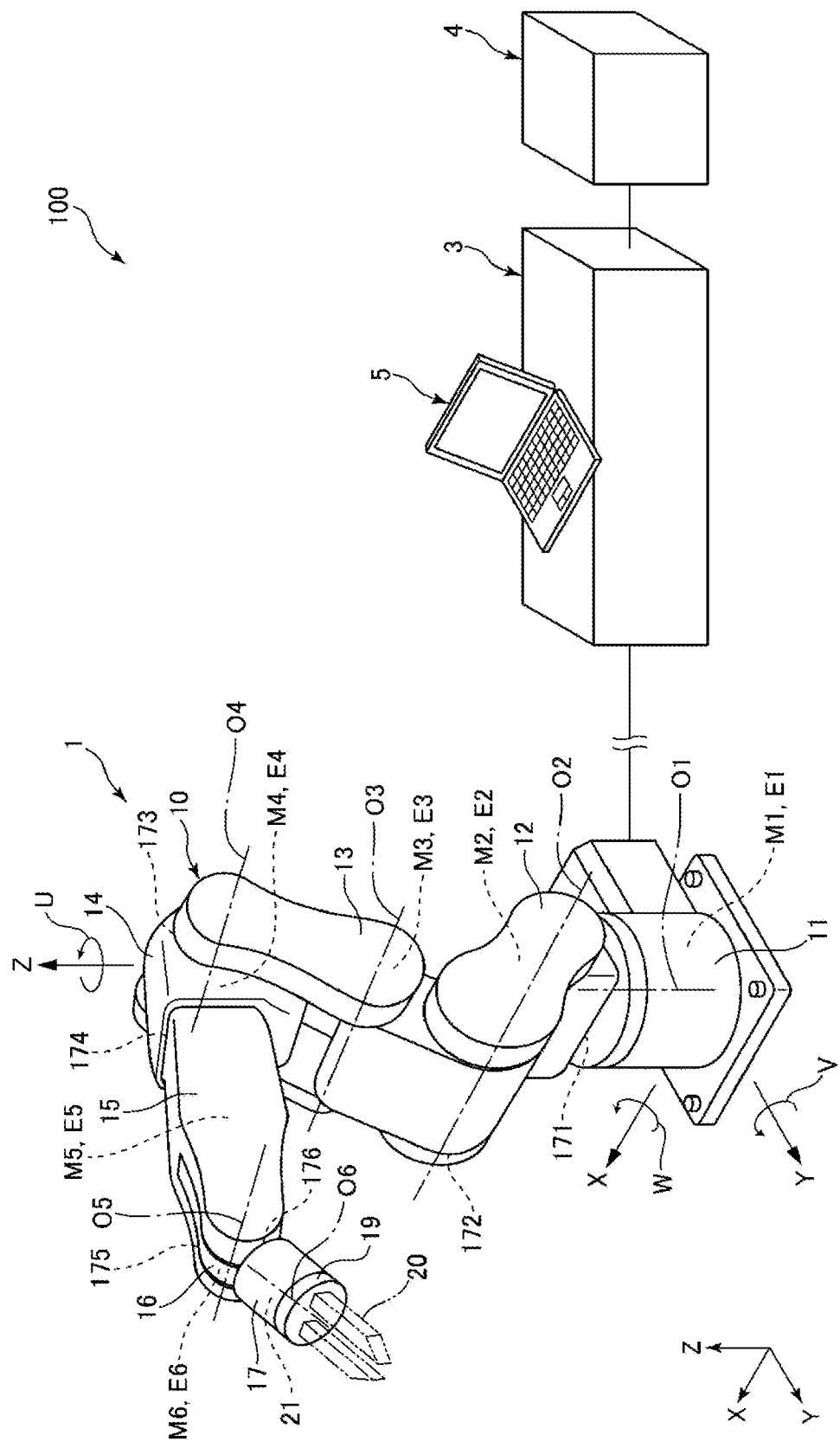
FIG. 1 is a diagram showing an overall configuration of a robot system in a first embodiment.
Figure 2:
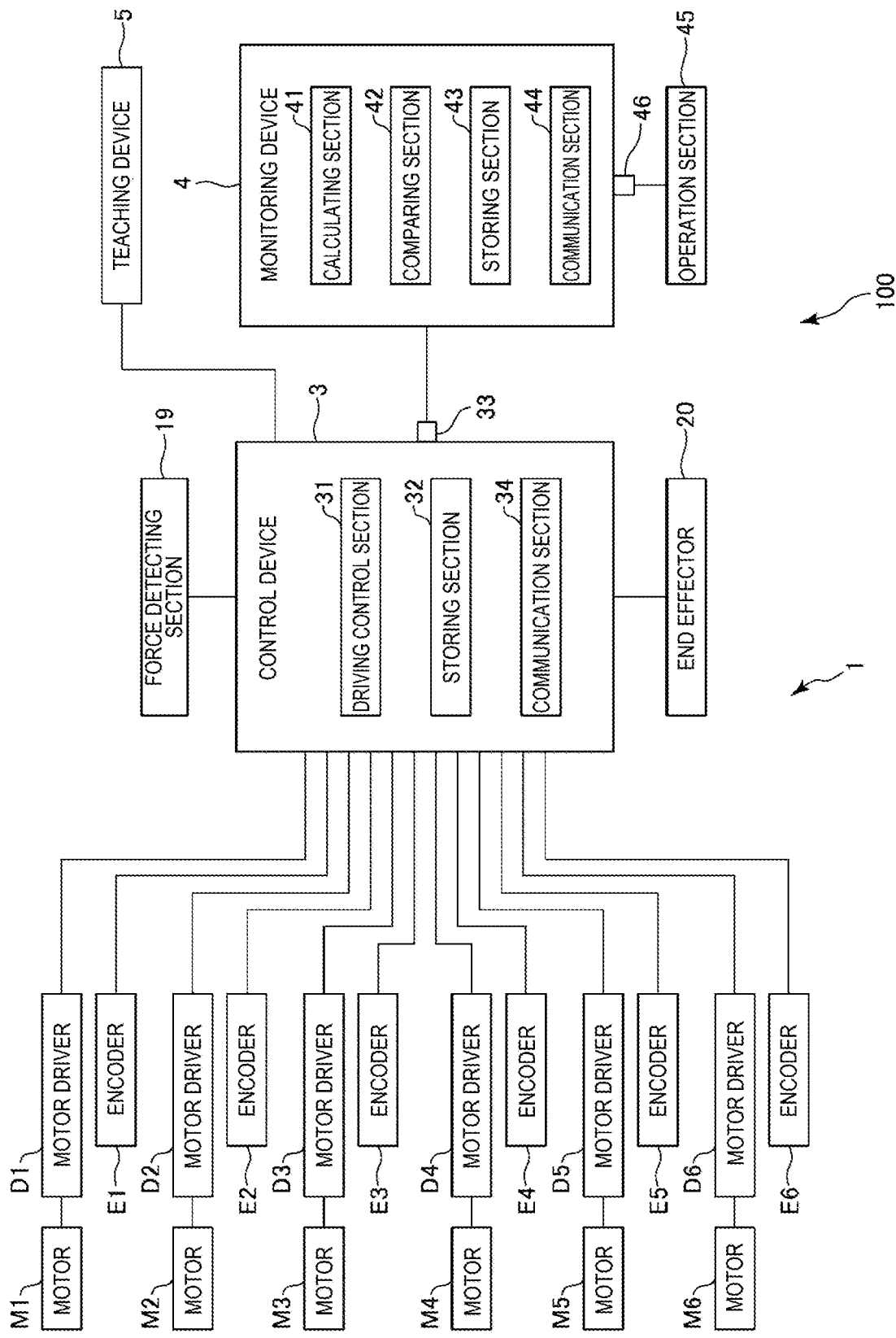
FIG. 2 is a block diagram of the robot system shown in FIG. 1.
Figure 3:
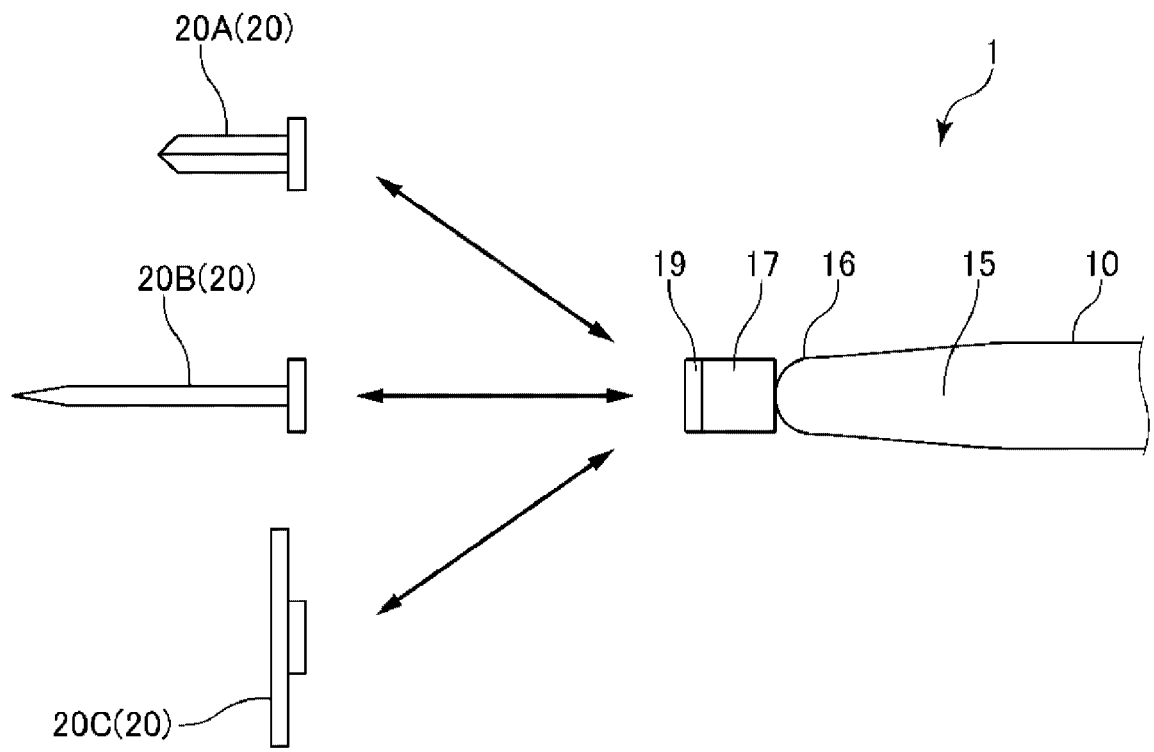
FIG. 3 is a diagram showing an end effector attached to a robot arm included in a robot shown in FIG. 1.
Figure 4:
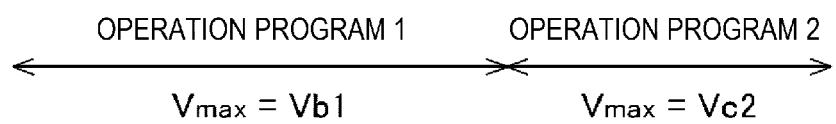
FIG. 4 is a conceptual diagram for explaining a unit operation program of an operation program executed by the robot system shown in FIG. 1.
Figure 9:
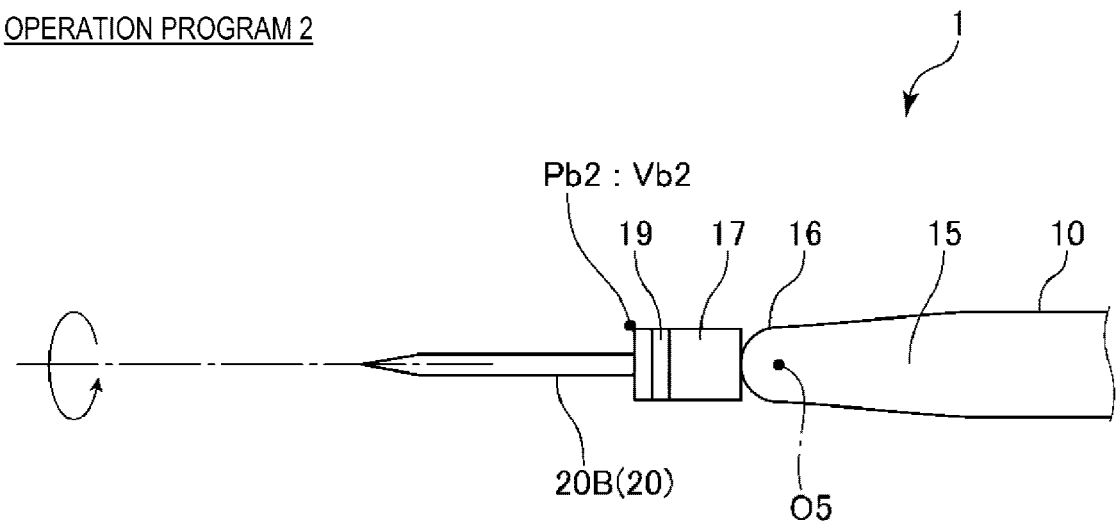
FIG. 9 is a side view showing the state in which the robot shown in FIG. 1 is executing the operation program.
Figure 10:
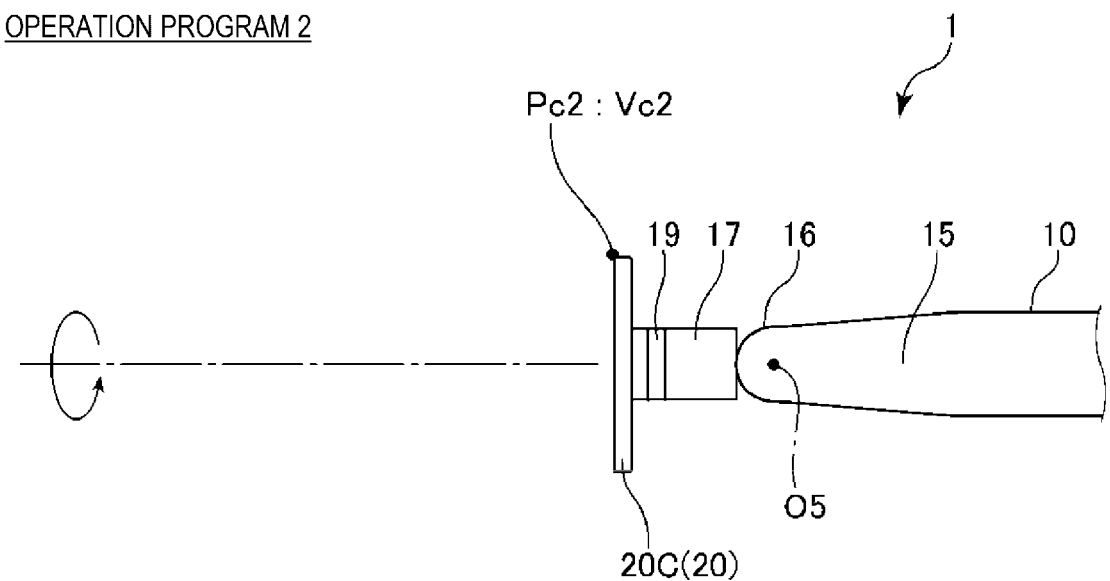
FIG. 10 is a side view showing the state in which the robot shown in FIG. 1 is executing the operation program.
Figure 11:
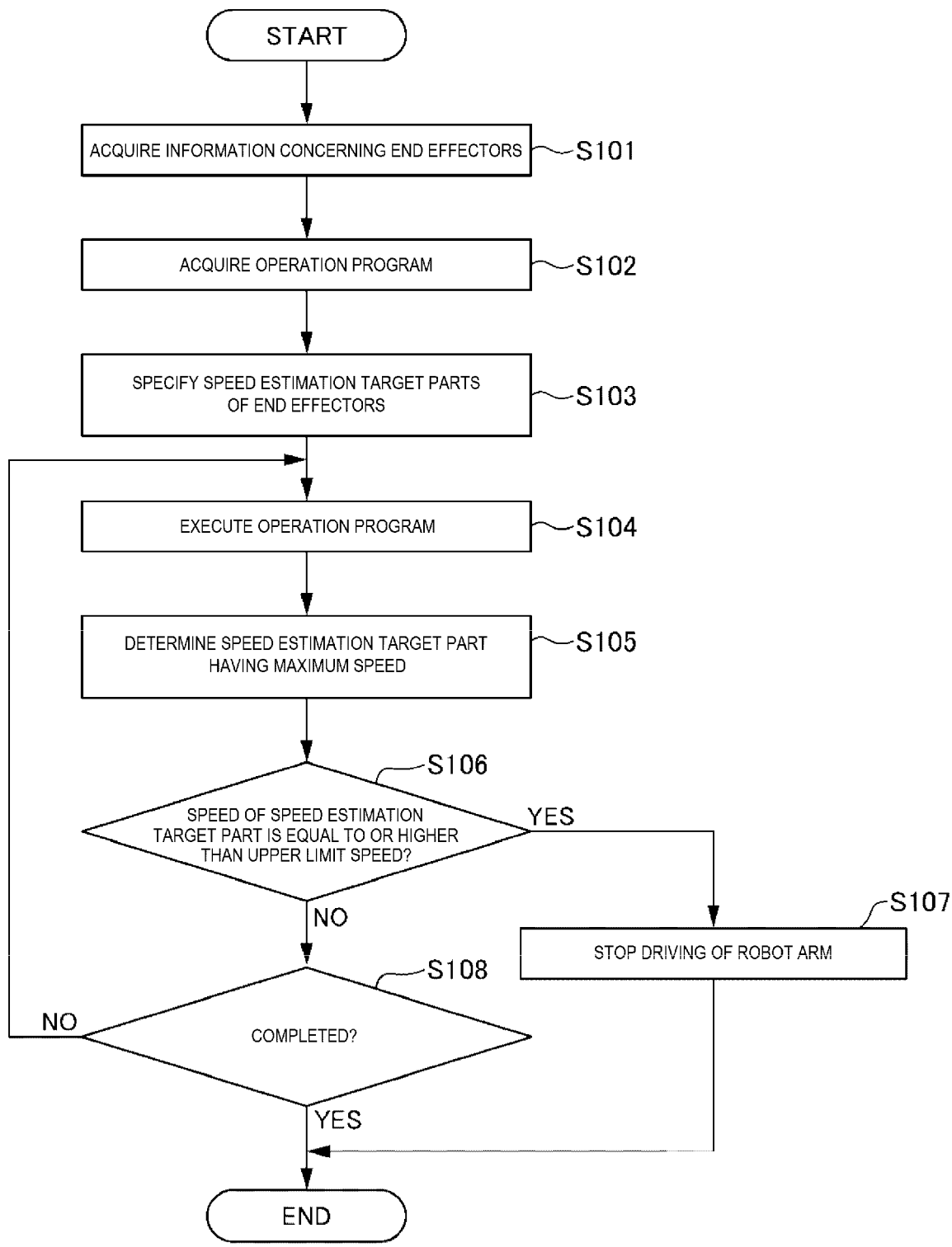
FIG. 11 is a flowchart for explaining a control operation of the robot system shown in FIG. 1.

FIG. 1 is a diagram showing an overall configuration of a robot system in a first embodiment. FIG. 2 is a block diagram of the robot system shown in FIG. 1. FIG. 3 is a diagram showing an end effector attached to a robot arm included in a robot shown in FIG. 1. FIG. 4 is a conceptual diagram for explaining a unit operation program of an operation program executed by the robot system shown in FIG. 1. FIGS. 5 to 10 are side views showing a state in which the robot shown in FIG. 1 is executing the operation program. FIG. 11 is a flowchart for explaining a control operation of the robot system shown in FIG. 1.

A control method and a robot system according to the present disclosure are explained in detail below based on preferred embodiments shown in the accompanying diagrams. In the following explanation, for convenience of explanation, an X axis, a Y axis, and a Z axis are illustrated as three axes orthogonal to one another. In the following explanation, a direction parallel to the X axis is referred to as "X-axis direction" as well, a direction parallel to the Y axis is referred to as "Y-axis direction" as well, and a direction parallel to the Z axis is referred to as "Z-axis direction" as well. In FIG. 1, a +Z-axis direction, that is, the upper side is referred to as "upper" as well and a −Z-axis direction, that is, the lower side is referred to as "lower" as well. Concerning the robot arm, in FIG. 1, a base 11 side is referred to as "proximal end" as well and the opposite side of the base 11 side, that is, an end effector 20 side is referred to as "distal end" as well. In FIG. 1, the Z-axis direction, that is, the up-down direction is represented as "vertical direction" and the X-axis direction and the Y-axis direction, that is, the left-right direction is represented as "horizontal direction".

As shown in FIG. 1, a robot system 100 is used in work such as holding, conveyance, assembly, and inspection of work such as an electronic component and an electronic device. The robot system 100 includes a robot 1, a control device 3 that controls the robot 1, and a teaching device 5.

The robot 1 is a single-arm six-axis vertical articulated robot in this embodiment. An end effector 20 can be attached to the distal end portion of the robot 1. The robot 1 is a single-arm articulated robot. However, the robot 1 is not limited to this and may be, for example, a double-arm articulated robot or may be a horizontal articulated robot.

The robot 1 includes a base 11 and a robot arm 10.

The base 11 is a supporting body that supports the robot arm 10 from the lower side to be capable of driving the robot arm 10. The base 11 is fixed to, for example, a floor of a factory. The base 11 of the robot 1 is electrically coupled to the control device 3 via a relay cable. The coupling between the robot 1 and the control device 3 is not limited to coupling by wire in the configuration shown in FIG. 1 and may be, for example, coupling by radio. Further the robot 1 and the control device 3 may be coupled via a network such as the Internet.

The control device 3 may be incorporated in the base 11.

In this embodiment, the robot arm 10 includes an arm 12, an arm 13, an arm 14, an arm 15, an arm 16, and an arm 17. These arms are coupled in this order from the base 11 side. The number of arms included in the robot arm 10 is not limited to six and may be, for example, one, two, three, four, five, or seven or more. The sizes such as the entire lengths of the arms are not respectively particularly limited and can be set as appropriate.

The base 11 and the arm 12 are coupled via a joint 171. With a first axis O1 parallel to the vertical direction set as a turning center, the arm 12 is capable of turning around the first axis O1 with respect to the base 11. The first axis O1 coincides with the normal of a floor to which the base 11 is fixed.

The arm 12 and the arm 13 are coupled via a joint 172. The arm 13 is capable of turning with respect to the arm 12 with a second axis O2 parallel to the horizontal direction set as a turning center. The second axis O2 is parallel to an axis orthogonal to the first axis O1.

The arm 13 and the arm 14 are coupled via a joint 173. The arm 14 is capable of turning with respect to the arm 13 with a third axis O3 parallel to the horizontal direction set as a turning center. The third axis O3 is parallel to the second axis O2.

The arm 14 and the arm 15 are coupled via a joint 174. The arm 15 is capable of turning with respect to the arm 14 with a fourth axis O4 parallel to the center-axis direction of the arm 14 set as a turning center. The fourth axis O4 is orthogonal to the third axis O3.

The arm 15 and the arm 16 are coupled via a joint 175. The arm 16 is capable turning with respect to the arm 15 with a fifth axis O5 set as a turning center. The fifth axis O5 is orthogonal to the fourth axis O4.

The arm 16 and the arm 17 are coupled via a joint 176. The arm 17 is capable of turning with respect to the arm 16 with a sixth axis O6 set as a turning center. The sixth axis O6 is orthogonal to the fifth axis O5.

The arm 17 is a robot distal end portion located on the most distal end side in the robot arm 10. The arm 17 can turn together with the end effector 20 according to driving of the robot arm 10.

The robot 1 includes a motor M1, a motor M2, a motor M3, a motor M4, a motor M5, and a motor M6 functioning as driving sections and an encoder E1, an encoder E2, an encoder E3, an encoder E4, an encoder E5, and an encoder E6.

The motor M1 is incorporated in the joint 171 and relatively rotates the base 11 and the arm 12. The motor M2 is incorporated in the joint 172 and relatively rotates the arm 12 and the arm 13. The motor M3 is incorporated in the joint 173 and relatively rotates the arm 13 and the arm 14. The motor M4 is incorporated in the joint 174 and relatively rotates the arm 14 and the arm 15. The motor M5 is incorporated in the joint 175 and relatively rotates the arm 15 and the arm 16. The motor M6 is incorporated in the joint 176 and relatively rotates the arm 16 and the arm 17.

The encoder E1 is incorporated in the joint 171 and detects the position of the motor M1. The encoder E2 is incorporated in the joint 172 and detects the position of the motor M2. The encoder E3 is incorporated in the joint 173 and detects the position of the motor M3. The encoder E4 is incorporated in the joint 174 and detects the position of the motor M4. The encoder E5 is incorporated in the joint 175 and detects the position of the motor M5. The encoder E6 is incorporated in the joint 176 and detects the position of the motor M6.

As shown in FIG. 2, the encoders E1 to E6 are electrically coupled to the control device 3. The positions of the motors M1 to M6 are transmitted to the control device 3 as electric signals. The encoders E1 to E6 detect rotation angles of the arms 12 to 17 and are detecting sections that detect motion of the robot arm 10. That is, the detecting sections are encoders that detect the rotation angles of the arms 12 to 17. Consequently, it is possible to accurately detect the motion of the robot arm 10.

The control device 3 drives the motor M1 via a motor driver D1 based on information concerning the positions. The control device 3 drives the motor M2 via a motor driver D2 based on the position information. The control device 3 drives the motor M3 via a motor driver D3 based on the position information. The control device 3 drives the motor M4 via a motor driver D4 based on the position information. The control device 3 drives the motor M5 via a motor driver D5 based on the position information. The control device 3 drives the motor M6 via a motor driver D6 based on the position information. That is, controlling the robot arm 10 means controlling the motors M1 to M6.

As shown in FIG. 1, a force detecting section 19, which detects force, is set in the robot arm 10. The robot arm 10 can be driven in a state in which the force detecting section 19 is set in the robot arm 10. In this embodiment, the force detecting section 19 is a six-axis force sensor. The force detecting section 19 detects the magnitudes of forces on three detection axes orthogonal to one another and the magnitudes of torques around the three detection axes. That is, the force detecting section 19 detects force components in axial directions of the X axis, the Y axis, and the Z axis orthogonal to one another, a force component in a W direction, which is a direction around the X axis, a force component in a V direction, which is a direction around the Y axis, and a force component in a U direction, which is a direction around the Z axis. In this embodiment, the Z-axis direction is the vertical direction. The force components in the axial directions can be referred to as "translational force components" as well and the force components around the axes can be referred to as "torque components" as well. The force detecting section 19 is not limited to the six-axis force sensor and may be sensors having other configurations. Such a force detecting section 19 is electrically coupled to the control device 3. Information equivalent to the detected forces is transmitted to the control device 3.

In this embodiment, the force detecting section 19 is set in the arm 17. A setting part of the force detecting section 19 is not limited to the arm 17, that is, an arm located on the most distal end side and may be, for example, other arms or between arms adjacent to each other.

The robot 1 includes an inertial sensor 21 set in any part of the robot arm 10. The inertial sensor 21 detects information equivalent to speed and acceleration of the robot arm 10. The inertial sensor 21 is electrically coupled to the control device 3. The information concerning the speed and the acceleration is transmitted to the control device 3 and used to control the robot 1.

In this embodiment, as explained below, a detection result of the inertial sensor 21 is not used for detection of the motion of the robot arm 10. However, the present disclosure is not limited to this. A detection result of the inertial sensor 21 may be used for detection of the motion of the robot arm 10. In this case, the inertial sensor 21 functions as a detecting section that detects the motion of the robot arm 10.

The end effector 20 can be detachably attached to the distal end portion of the robot arm 10 via the force detecting section 19. As shown in FIG. 3, there are a plurality of types as the end effector 20. In FIG. 3, as an example, three end effectors are illustrated.

An end effector 20A includes two claw sections and can perform work for gripping work, a tool, or the like by bringing the claw sections close to and separating the claw sections from each other. An end effector 20B includes a screwdriver and can perform screwing work and the like. An end effector 20C includes a dicing blade and can perform polishing work and the like.

In the robot 1, desired work can be performed by selectively disposing such end effectors 20A to 20C on the distal end side of the robot arm 10. In the robot system 100, in a robot coordinate system, control points are set in predetermined positions of the end effectors 20A to 20C. The control points mean points serving as references in performing control of the robot arm 10.

Actuation of such a robot 1 is controlled by the control device 3.

The control device 3 is explained.

The robot system 100 includes the control device 3, a monitoring device 4, and the teaching device 5. The control device 3 is communicably coupled to the robot 1 by a relay cable. Components of the control device 3 may be included in the robot 1. The control device 3 is coupled to the monitoring device 4 and the teaching device 5 by a cable or is wirelessly communicably coupled to the monitoring device 4 and the teaching device 5. The teaching device 5 may be a dedicated computer or may be a general-purpose computer in which a program for teaching the robot 1 is installed. For example, a teaching pendant, which is a dedicated device for teaching the robot 1, may be used instead of the teaching device 5. Further, the control device 3, the monitoring device 4, and the teaching device 5 may include separate housing as shown in FIG. 1 or may be integrally configured.

The control device 3 includes a driving control section 31, a storing section 32, an input port 33, and a communication section 34. These sections are configured to be capable of communicating with one another via a not shown bus.

The driving control section 31 includes a processor such as a CPU (Central Processing Unit). The driving control section 31 controls to drive the sections of the robot arm 10 and the end effector 20 independently from each other based on an operation program acquired from the teaching device 5. That is, the driving control section 31 is a portion that executes a driving step explained below.

The driving control section 31 may be set in a place separate from the control device 3 via a network such as a LAN (Local Area Network).

Various programs executable by the driving control section 31, reference data, thresholds, calibration curves, and the like to be used during a control operation are stored in the storing section 32. The various programs include at least a part of a program for executing a control method according to the present disclosure.

The storing section 32 includes a volatile memory such as a RAM (Random Access Memory) and a nonvolatile memory such as a ROM (Read Only Memory). The storing section 32 is not limited to a non-detachable type and may include a detachable external storage device. The storing section 32 may be set in a place separate from the control device 3 via a network such as a LAN (Local Area Network).

The control device 3 includes a terminal, that is, the input port 33 to which various kinds of information are input from the monitoring device 4.

The communication section 34 performs transmission and reception of signals between the communication section 34 and the monitoring device 4 using an external interface such as a wired LAN (Local Area Network) or a wireless LAN.

In addition to the components explained above, other components may be further added to the control device 3. The various programs, the data, and the like saved in the storing section 32 may be stored in the storing section 32 in advance, may be stored in a recording medium such as a CD-ROM and provided from the recording medium, or may be provided via a network or the like.

The monitoring device 4 is explained.

The monitoring device 4 includes a calculating section 41, a comparing section 42, a storing section 43, a communication section 44, and an operation section 45. These sections are configured to be capable of communicating with one another via a not-shown bus.

The calculating section 41 includes a processor such as a CPU (Central Processing Unit). As explained below, the calculating section 41 specifies speed estimation target parts Pa1 to Pc1 and speed estimation target parts Pa2 to Pc2 of the end effectors 20A to 20C and respectively estimates, that is, calculates speeds of the speed estimation target parts Pa1 to Pc1 and the speed estimation target parts Pa2 to Pc2. In other words, the calculating section 41 is a portion that performs a calculating step explained below.

The calculating section 41 can calculate, based on detection results over time of the encoders E1 to E6 functioning as the detecting sections and information concerning the end effectors 20A to 20C, speeds of the speed estimation target parts Pa1 to Pc1 and the speed estimation target parts Pa2 to Pc2.

The calculating section 41 may be set in a place separate from the monitoring device 4, for example, in the control device 3 via a network such as a LAN (Local Area Network). When the calculating section 41 is provided in the control device 3, the terminal, that is, the input port 33 of the control device 3, to which various kinds of information is input from the monitoring device 4, functions as an acquiring section that performs an acquiring step for acquiring information concerning the end effectors 20A to 20C and an operation program.

The comparing section 42 includes a processor such as a CPU (Central Processing Unit). As explained below, the comparing section 42 is a portion that, when the robot arm 10 is driven by the acquired operation program, estimates, based on a detection result of the detecting section, speed of a speed estimation target part moving at the highest speed and compares a result of the estimation, that is, a calculation result and predetermined speed.

The comparing section 42 may be set in a place separate from the monitoring device 4, for example, in the control device 3 via a network such as a LAN (Local Area Network).

The storing section 43 includes a volatile memory such as a RAM (Random Access Memory) and a nonvolatile memory such as a ROM (Read Only Memory). The storing section 43 is not limited to a non-detachable type and may include a detachable external storage device. The storing section 43 may be set in a place separate from the monitoring device 4 via a network such as a LAN (Local Area Network).

The communication section 44 performs transmission and reception of signals between the communication section 44 and the control device 3 using an external interface such as a wired LAN (Local Area Network) and a wireless LAN.

In the illustrated configuration, the operation section 45 is a notebook personal computer and includes a mouse and a keyboard. An operator operates the operation section 45 to input information concerning the end effectors 20A to 20C and an operation program as explained below.

The information input by the operation section 45 is captured into the storing section 43 of the monitoring device 4 via a terminal, that is, an input port 46. That is, in this embodiment, the input port 46 functions as an acquiring section that performs an acquiring step for acquiring the information concerning the end effectors 20A to 20C and the operation program.

The configuration of the robot system 100 is explained above.

In a robot in the past, a detecting section detects an end effector to be attached. The robot is controlled after the end effector to be attached is specified. In this case, when an operator attaches an end effector undetectable by the detecting section and drives the robot, during the driving of the robot, speed of the end effector is sometimes higher than expected and safety is deteriorated. The present disclosure is effective for preventing such a problem. This is explained below.

First, prior to driving the robot 1, the operator inputs information concerning an attachable end effector 20 using the operation section 45 shown in FIG. 2. The attachable end effector 20 hereinafter means the end effector 20 that is likely to be attached to the robot arm 10. During the input, the operator preferably inputs all of types of end effectors 20 grasped by the operator. In the following explanation, it is assumed that, as shown in FIG. 3, three end effectors 20A to 20C are all end effectors grasped by the operator.

The information concerning the end effectors 20A to 20C input by the operator is not particularly limited if the shape of each of the end effectors 20A to 20C can be specified. Examples of the information include a maximum length and a maximum width of each of the end effectors 20A to 20C.

An input method for the information is not particularly limited. Examples of the input method include a method of inputting dimensions of each of the end effectors 20A to 20C and a method of inputting information for specifying each of the end effectors 20A to 20C, for example, a commodity name. In the latter case, for example, it is preferable to acquire information concerning dimensions from information concerning the commodity name via a network.

The operator designates an operation program. The operation program is a program concerning work content performed by the robot 1 and is a program for determining what kind of motion the robot 1 performs.

The information concerning the end effectors 20A to 20C and the operation program input by the operator are stored in at least one of the storing section 32 and the storing section 43, preferably, respectively stored in both of the storing section 32 and the storing section 43. The input of the information concerning the end effectors 20A to 20C and the input of the operation program may be performed in this order or may be performed in the opposite order.

Figure 5:
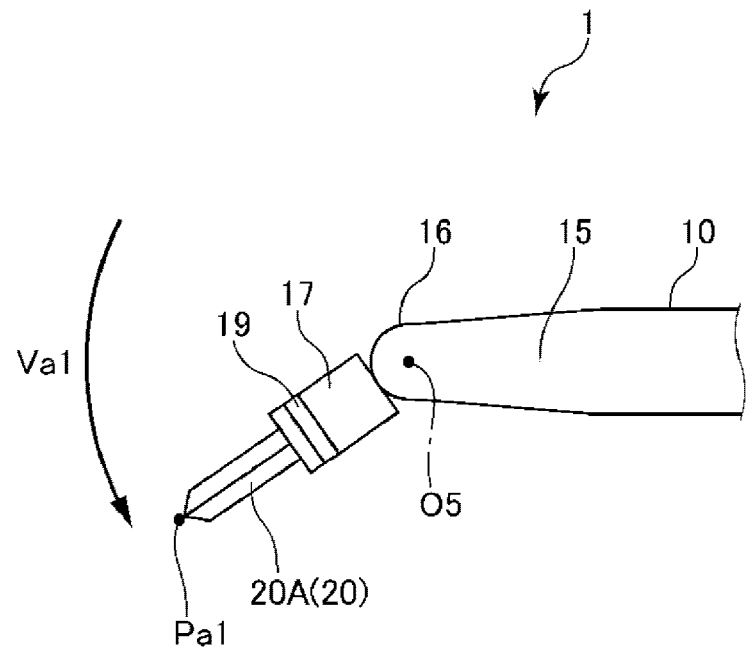
FIG. 5 is a side view showing a state in which the robot shown in FIG. 1 is executing the operation program.
Figure 6:
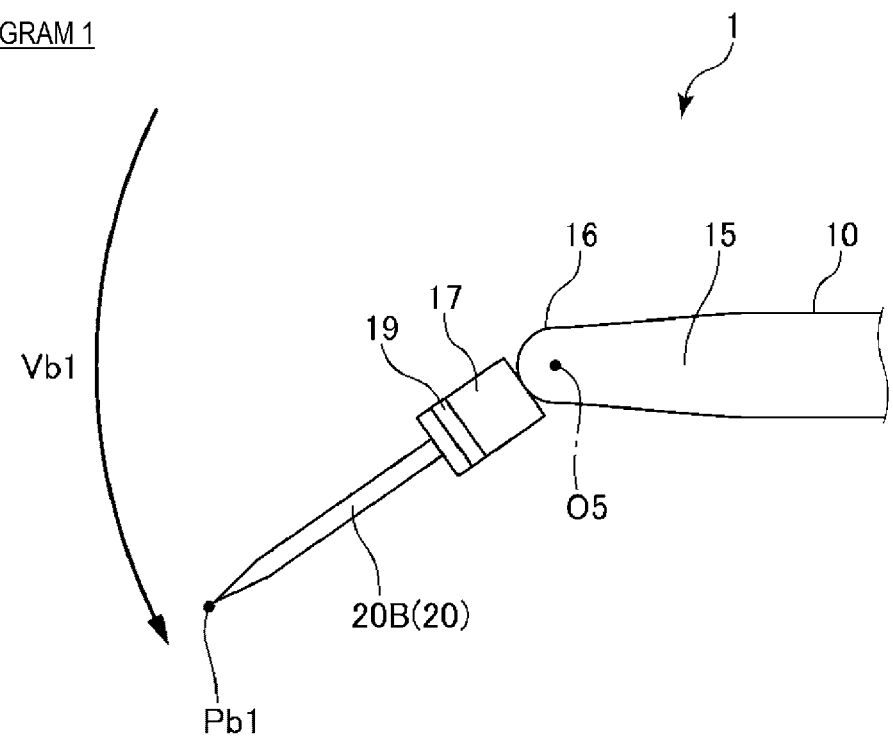
FIG. 6 is a side view showing the state in which the robot shown in FIG. 1 is executing the operation program.
Figure 7:
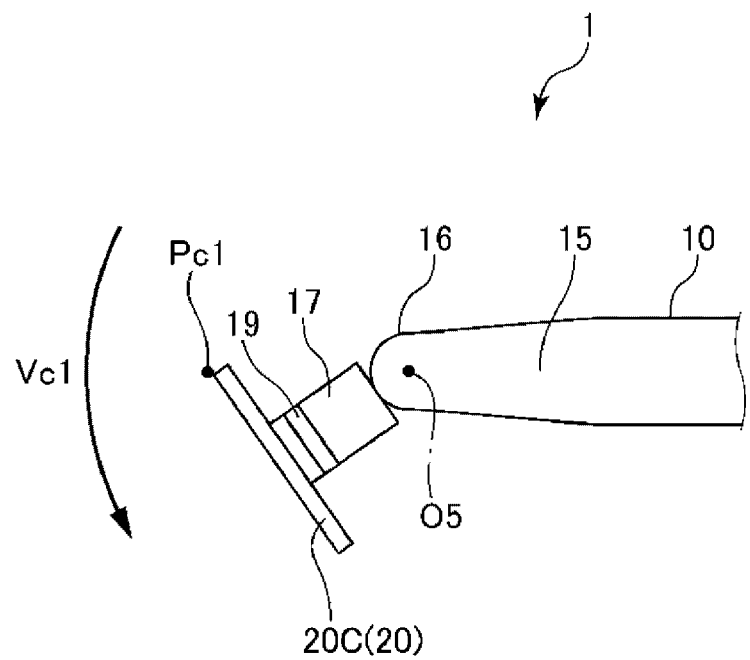
FIG. 7 is a side view showing the state in which the robot shown in FIG. 1 is executing the operation program.
Figure 8:
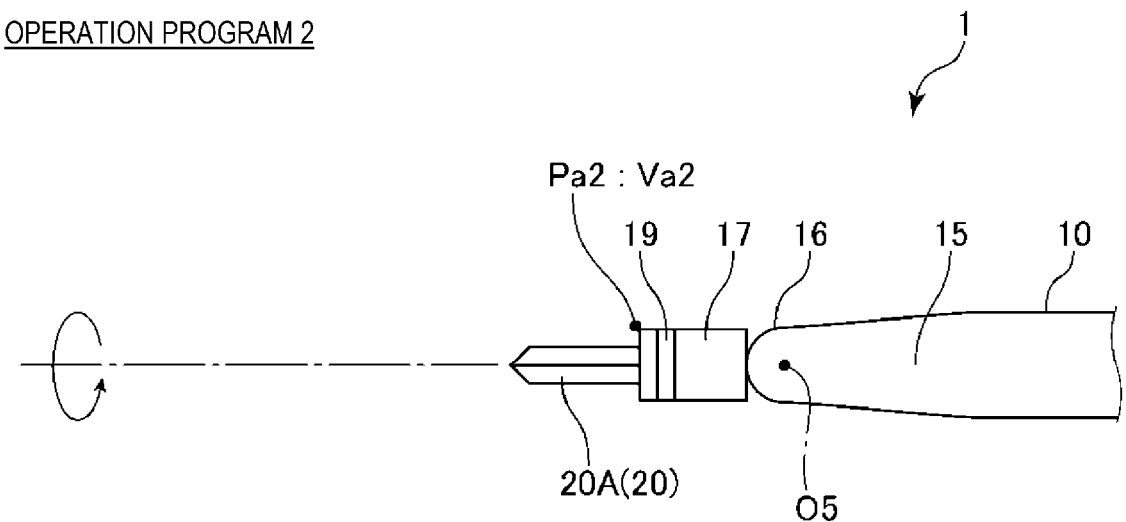
FIG. 8 is a side view showing the state in which the robot shown in FIG. 1 is executing the operation program.

In the following explanation, an example is explained in which, as shown in FIG. 4, the input operation program includes an operation program (1) and an operation program (2), which are unit operation programs, and these operation programs (1) and (2) are sequentially performed. The operation program (1) is a program for the attached end effector 20 to perform motion of turning around the fifth axis O5 as shown in FIGS. 5 to 7. The operation program (2) is a program for the attached end effector 20 to perform motion of rotating around the sixth axis O6 as shown in FIGS. 8 to 10.

Prior to driving of the robot arm 10, the calculating section 41 specifies speed estimation target parts of the end effectors 20A to 20C based on the input information concerning the end effectors 20A to 20C and the input operation program.

First, a method of specifying a speed estimation target part in the operation program (1) is explained.

As shown in FIG. 5, when the end effector 20A is attached, the calculating section 41 specifies a speed estimation target part Pa1, which is a part where speed is the highest during the execution of the operation program (1), in the end effector 20A. As shown in FIG. 6, when the end effector 20B is attached, the calculating section 41 specifies a speed estimation target part Pb1, which is a part where speed is the highest during the execution of the operation program (1), in the end effector 20B. As shown in FIG. 7, when the end effector 20C is attached, the calculating section 41 specifies a speed estimation target part Pc1, which is a part where speed is the highest during the execution of the operation program (1), in the end effector 20C.

For example, in the case of the turning motion in the operation program (1), a portion most separated from the distal end of the arm 17 in the end effector 20A is set as the speed estimation target part Pa1. A portion most separated from the distal end of the arm 17 in the end effector 20B is set as the speed estimation target part Pb1. A part most separated from the distal end of the arm 17 in the end effector 20C is set as the speed estimation target part Pc1.

A method of specifying a speed estimation target part in the operation program (2) is explained.

As shown in FIG. 8, when the end effector 20A is attached, the calculating section 41 specifies a speed estimation target part Pa2, which is a part where speed is the highest during the execution of the operation program (2), in the end effector 20A. As shown in FIG. 9, when the end effector 20B is attached, the calculating section 41 specifies a speed estimation target part Pb2, which is a part where speed is the highest during the execution of the operation program (2), in the end effector 20B. As shown in FIG. 10, when the end effector 20C is attached, the calculating section 41 specifies a speed estimation target part Pc2, which is a part where speed is the highest during the execution of the operation program (2), in the end effector 20C.

For example, in the case of the rotating operation in the operation program (2), a portion most separated from the center axis of the arm 17 in the end effector 20A is set as the speed estimation target part Pa2. A portion most separated from the center axis of the arm 17 in the end effector 20B is set as the speed estimation target part Pb2. A part most separated from the center axis of the arm 17 in the end effector 20C is set as the speed estimation target part Pc2.

In this way, the speed estimation target parts Pa1 to Pc1 and the speed estimation target parts Pa2 to Pc2 are specified.

The driving control section 31 drives the robot arm 10 based on the input operation program. That is, the driving control section 31 sequentially executes the operation program (1) and the operation program (2). During the execution, the control device 3 and the teaching device 5 do not grasp which end effector 20 is attached to the distal end portion of the robot arm 10. That is, the control device 3 and the monitoring device 4 cannot specify a type of the currently attached end effector 20.

First, the execution of the operation program (1) is explained.

During the driving of the robot arm 10, the calculating section 41 calculates current angles of the joints 171 to 176 based on detection results of the encoders E1 to E6, which are the detecting sections, and reduction ratios of not-shown speed reducers. The calculating section 41 respectively estimates, that is, calculates speeds of the speed estimation target parts Pa1 to Pc1 based on the calculated angles of the joints 171 to 176, the length of each of the arms 12 to 17, and the information concerning the end effector 20.

As shown in FIGS. 5 to 7, when the operation program (1) is executed, speed Vb1 of the speed estimation target part Pb1 of the end effector 20B shown in FIG. 6 is higher than speed Va1 and speed Vc1 shown in FIGS. 5 and 7. The speed Vb1 of the speed estimation target part Pb1 is maximum speed Vmax.

The comparing section 42 compares the speed Vb1, which is the maximum speed Vmax, and speed V0 stored in the storing section 43 in advance. The speed V0 is an upper limit value of safe speed and can be set as appropriate. When the speed Vb1 is equal to or higher than the speed V0, the driving control section 31 reduces operating speed of the robot arm 10, preferably, stops the robot arm 10.

In other words, the monitoring device 4 cannot specify a type of the end effector 20 but compares the speed Vb1 and the speed V0 assuming that the end effector 20B moving fastest is attached in the current operation program (1). When the speed Vb1 is equal to or higher than the speed V0, the driving control section 31 reduces the operating speed of the robot arm 10, preferably, stops the robot arm 10. With such a configuration, even if the end effector 20A or the end effector 20C is attached, the speed estimation target part Pa1 does not move at speed higher than the speed V0 during the driving of the robot arm 10 based on the operation program (1).

The execution of the operation program (2) is explained.

During the driving of the robot arm 10, the calculating section 41 calculates current angles of the joints 171 to 176 based on detection results of the encoders E1 to E6, which are the detecting sections, and reduction ratios of the not-shown speed reducers. The calculating section 41 respectively estimates, that is, calculates speeds of the speed estimation target parts Pa2 to Pc2 based on the calculated angles of the joints 171 to 176, the length of each of the arms 12 to 17, and the information concerning the end effector 20.

As shown in FIGS. 8 to 10, when the operation program (2) is executed, speed Vc2 of the speed estimation target part Pc2 of the end effector 20C shown in FIG. 10 is higher than speed Va2 and speed Vb2 shown in FIGS. 8 and 9. The speed Vc2 of the speed estimation target part Pc2 is the maximum speed Vmax.

The comparing section 42 compares the speed Vc2, which is the maximum speed Vmax, and the speed V0 stored in the storing section 43 in advance. The speed V0 is an upper limit value of safe speed and can be set as appropriate. The speed V0 in the operation program (1) and the speed V0 in the operation program (2) may be the same or may be different.

When the speed Vc2 is equal to or higher than the speed V0, the driving control section 31 reduces operating speed of the robot arm 10, preferably, stops the robot arm 10.

In other words, the monitoring device 4 cannot specify a type of the end effector 20 but compares the speed Vc2 and the speed V0 assuming that the end effector 20C moving fastest is attached in the current operation program (2). When the speed Vc2 is equal to or higher than the speed V0, the driving control section 31 reduces the operating speed of the robot arm 10, preferably, stops the robot arm 10. With such a configuration, even if the end effector 20A or the end effector 20B is attached, the speed estimation target part Pa1 does not move at speed higher than the speed V0 during the driving of the robot arm 10 based on the operation program (2).

As explained above, the robot system 100 includes the robot arm 10 including the arm 17 to which one of the plurality of end effectors 20A to 20C is selectively detachably attachable, the robot arm 10 being driven based on an operation program, the encoders E1 to E6 functioning as the detecting sections that detect the motion of the robot arm 10, the input port 46 functioning as the acquiring section that acquires information concerning the end effectors 20A to 20C and acquires the operation program, the calculating section 41 that calculates, based on the information acquired by the input port 46, speeds of the speed estimation target parts Pa1 to Pc1 and the speed estimation target parts Pa2 to Pc2 for each of the end effectors 20A to 20C, the driving control section 31 that drives the robot arm 10 based on the operation program, and the comparing section 42 that calculates, based on detection results of the encoders E1 to E6, speed of a speed estimation target part moving at the highest speed when the robot arm 10 is driven by the acquired operation program and compares a result of the calculation and predetermined speed. When the comparing section 42 determines that the calculation result is equal to or higher than the speed, the driving control section 31 reduces the operating speed of the robot arm 10. Consequently, it is possible to safely drive the robot arm 10 even if it is not detected which end effector is attached.

A control method for the robot system 100 is explained with reference to a flowchart of FIG. 11.

First, prior to driving the robot 1, the operator inputs information concerning an attachable end effector 20 using the operation section 45 shown in FIG. 2. According to the input, in step S101, information concerning the end effectors 20, in this embodiment, information concerning the end effectors 20A to 20C can be acquired.

As explained above, the information concerning the end effectors 20A to 20C, which are the plurality of end effectors, includes information concerning shapes. Consequently, it is possible to accurately set speed estimation target parts of the end effectors 20A to 20C.

Subsequently, the operator inputs an operation program using the operation section 45 shown in FIG. 2. According to the input, in step S102, the operation program can be acquired.

Such steps S101 and S102 are an acquiring step. Steps S101 and S102 may be performed in order opposite to the order described above or may be simultaneously performed.

Subsequently, in step S103, the driving control section 31 specifies speed estimation target parts of the end effectors 20A to 20C based on the information concerning the end effectors 20A to 20C input in step S101 and the operation program input in step S102.

The speed estimation target parts may be specified for each of unit operation programs, for example, as explained above, for each of the operation programs (1) and (2) or may be performed any time at every predetermined time.

As explained above, in a state in which one of the end effectors 20A to 20C is attached to the arm 17, the speed estimation target part is a portion most separated from the arm 17 or, when viewed from the center axis of the arm 17, a portion most separated from the center axis. Consequently, a portion where moving speed is the highest is easily set as the speed estimation target part.

Subsequently, in step S104, the driving control section 31 executes the operation program. In this embodiment, the driving control section 31 sequentially executes the operation program (1) and the operation program (2).

Subsequently, in step S105, the driving control section 31 respectively estimates speeds of the speed estimation target parts specified in step S103 and determines a speed estimation target part having the maximum speed Vmax for each of the unit operation programs. That is, as explained above, in the operation program (1), the driving control section 31 determines the speed estimation target part Pb1 of the end effector 20B as the speed estimation target part. In the operation program (2), the driving control section 31 determines the speed estimation target part Pc2 of the end effector 20C as the speed estimation target part.

Subsequently, in step S106, the driving control section 31 compares the speed of the speed estimation target part and the speed V0. The driving control section 31 determines whether the speed of the speed estimation target part is equal to or higher than the speed V0. Specifically, during the execution of the operation program (1), the driving control section 31 determines whether the speed of the speed estimation target part Pb1 is equal to or higher than the speed V0. During the execution of the operation program (2), the driving control section 31 determines whether the speed of the speed estimation target part Pc2 is equal to or higher than the speed V0.

When determining in step S106 that the speed of the speed estimation target part is equal to or higher than the speed V0, in step S107, the driving control section 31 stops the driving of the robot arm 10. Consequently, safety can be improved.

When determining in step S107 that the speed of the speed estimation target part is lower than the speed V0, in step S108, the driving control section 31 determines whether execution of all operation programs is completed. When determining in step S108 that the execution of all the operation programs is completed, the driving control section 31 ends the control operation. On the other hand, when determining in step S108 that the execution of all the operation programs is not completed, the driving control section 31 returns to step S104 and sequentially repeats step S104 and subsequent steps.

As explained above, the control method according to the present disclosure is the control method for the robot including the robot arm 10 including the arm to which one of the plurality of end effectors 20A to 20C is selectively detachably attachable, the robot arm 10 being driven based on an operation program, and the encoders E1 to E6, which are the detecting sections that detect the motion of the robot arm 10. The control method according to the present disclosure includes the acquiring step for acquiring information concerning the end effectors 20A to 20C and acquiring an operation program and the driving step for driving the robot arm 10 based on the operation program acquired in the acquiring step. In the driving step, speed of a speed estimation target part is calculated for each of the end effectors 20A to 20C based on detection results of the encoders E1 to E6. When it is determined that, in a result of the calculation, speed of a speed estimation target part moving at the highest speed when the robot arm 10 is driven by the acquired operation program is equal to or higher than the predetermined speed V0, operating speed of the robot arm 10 is reduced. Consequently, it is possible to safely drive the robot arm 10 even if it is not detected which end effector is attached.

As explained above, in the acquiring step, the plurality of operation programs (1) and (2) for performing the different operations are acquired. In the driving step, speed of an estimation target part moving at the highest speed is calculated for each of the operation programs (1) and (2) and a result of the calculation and the speed V0 are respectively compared. Consequently, it is possible to appropriately determine a comparison target of the speed V0 according to a type of an operation program. Accordingly, in the operation programs, it is possible to safely drive the robot arm 10.

As explained above, the control device 3 and the monitoring device 4 share and perform steps S101 to S108. However, the sharing of the steps is not limited to the above description. Only one of the control device 3 and the monitoring device 4 may execute steps 101 to 108.

Second Embodiment

Figure 12:
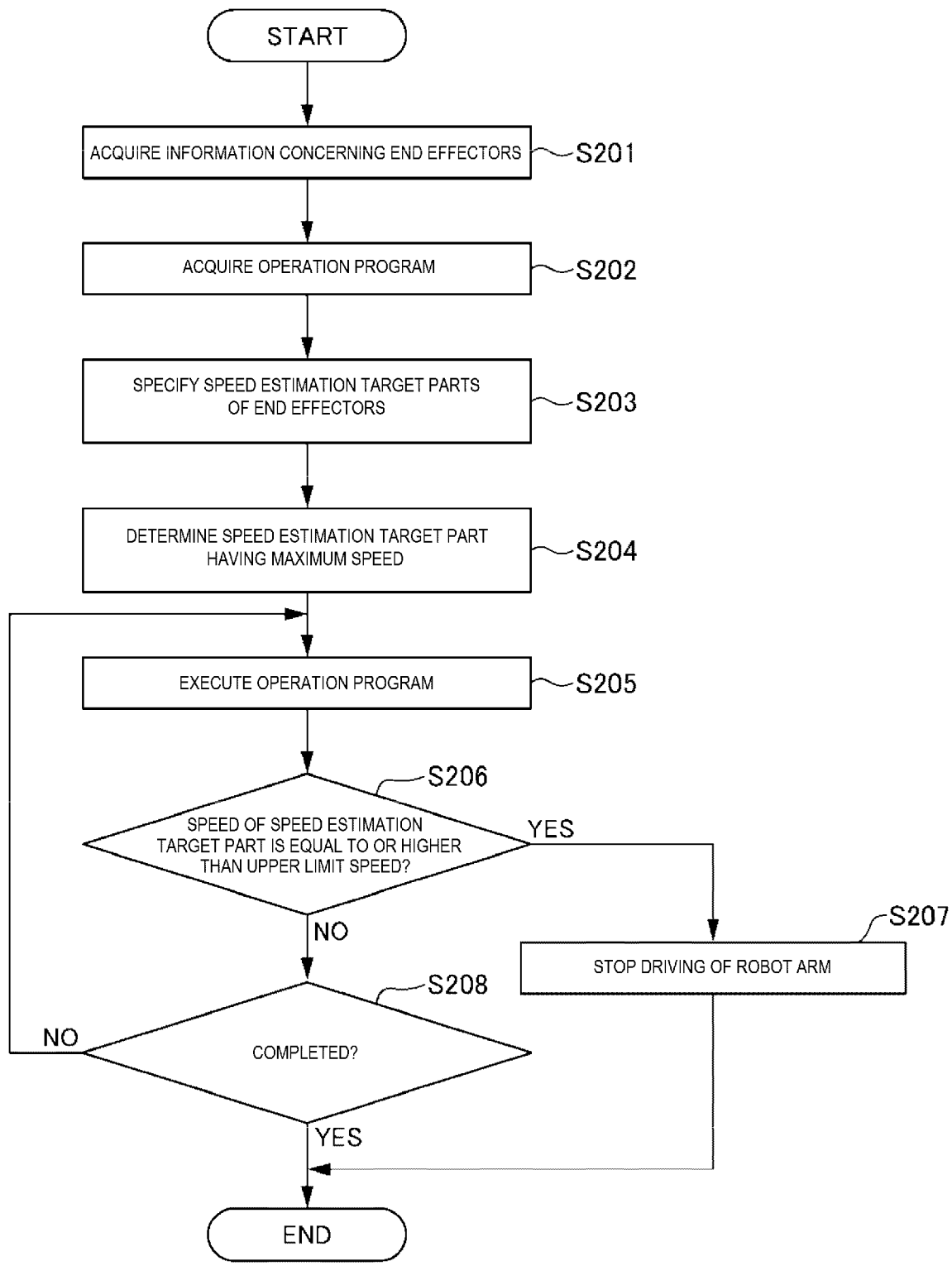
FIG. 12 is a flowchart for explaining a control operation of a robot system in a second embodiment.

FIG. 12 is a flowchart for explaining a control operation of a robot system in a second embodiment.

The second embodiment is explained below. In the following explanation, differences from the first embodiment are mainly explained. Explanation about similarities is omitted.

As shown in FIG. 12, in this embodiment, the driving control section 31 sequentially executes step S201, step S202, step S203, step S204, step S205, step S206, step S207, and step S208.

Step S201 is the same as step S101. Step S202 is the same as step S102. Step S203 is the same as step S103. Step S204 is the same as step S105. Step S205 is the same as step S104. Step S206 is the same as step S106. Step S207 is the same as step S107. Step S208 is the same as step S108.

That is, in this embodiment, prior to executing an operation program, the driving control section 31 respectively calculates, based on information acquired in an acquiring step, speeds of speed estimation target parts of the end effectors 20A to 20C for each of unit operation programs. The driving control section 31 calculates speed of a speed estimation target part moving at the highest speed among the speed estimation target parts while actually driving the robot arm 10 in a driving step and compares a result of the calculation and the speed V0.

As explained above, the control method according to the present disclosure is a control method for the robot including the robot arm 10 including the arm to which one of the plurality of end effectors 20A to 20C is selectively detachably attachable, the robot arm 10 being driven based on an operation program, and the encoders E1 to E6, which are the detecting sections that detect the motion of the robot arm 10. The control method according to the present disclosure includes the acquiring step for acquiring information concerning the end effectors 20A to 20C and acquiring an operation program, the calculating step for calculating, based on the information acquired in the acquiring step, speeds of speed estimation target parts for each of the end effectors 20A to 20C and calculating, based on a detection result of the encoders E1 to E6, speed of a speed estimation target part moving at the highest speed when the robot arm 10 is driven by the operation program in a result of the calculation, and the driving step for driving the robot arm 10 based on the operation program acquired in the acquiring step. In the driving step, when it is determined that the calculation result is equal to or higher than the predetermined speed V0, operating speed of the robot arm 10 is reduced. Consequently, it is possible to safely drive the robot arm 10 even if it is not detected which end effector is attached. In particular, since the speeds of the speed estimation target parts are respectively calculated prior to executing the driving step, it is possible to specify, prior to executing the driving step, the speed estimation target part moving at the highest speed. Accordingly, control in the driving step is simplified. Smoother driving can be realized.

Another Configuration Example of the Robot System

Figure 13:
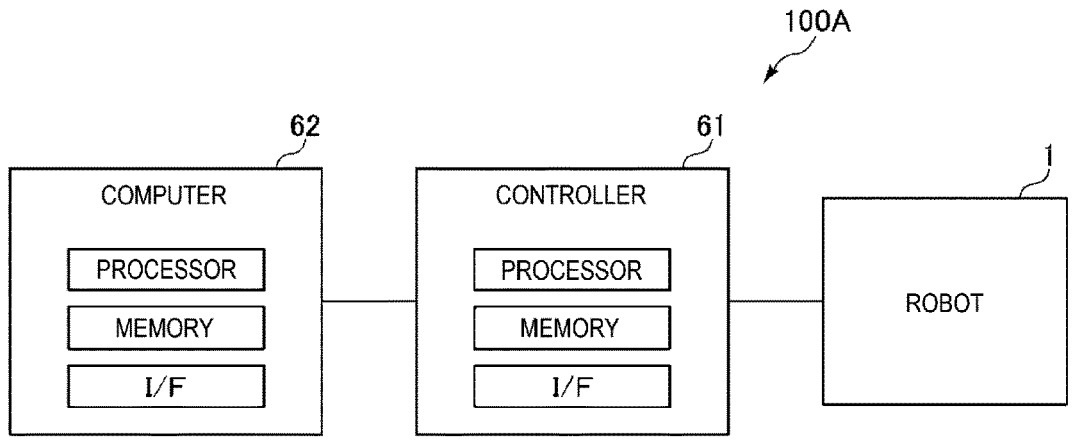
FIG. 13 is a block diagram for explaining the robot system centering on hardware.

FIG. 13 is a block diagram for explaining the robot system centering on hardware.

In FIG. 13, an entire configuration of a robot system 100A in which the robot 1, a controller 61, and a computer 62 are coupled is shown. Control of the robot 1 may be executed by a processor present in the controller 61 reading out a command present in a memory or may be executed, via the controller 61, by a processor present in the computer 62 reading out a command present in a memory.

Therefore, one or both of the controller 61 and the computer 62 can be grasped as a "control device".

Modification 1

Figure 14:
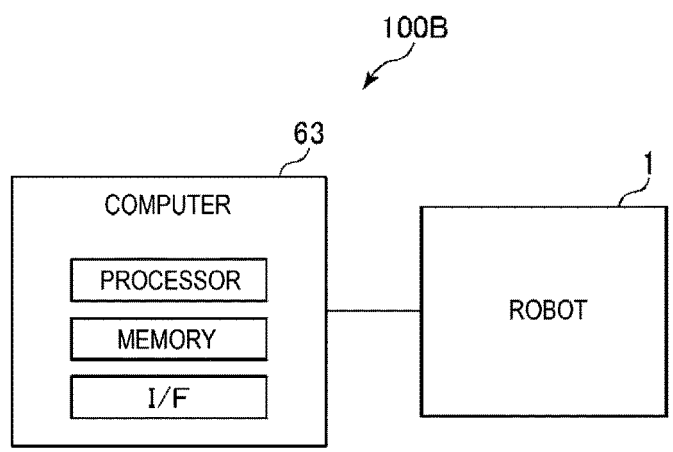
FIG. 14 is a block diagram showing a modification 1 centering on the hardware of the robot system.

FIG. 14 is a block diagram showing a modification 1 centering on hardware of a robot system.

In FIG. 14, an overall configuration of a robot system 100b in which a computer 63 is directly coupled to the robot 1 is shown. Control of the robot 1 is directly executed by a processor present in the computer 63 reading out a command present in a memory.

Therefore, the computer 63 can be grasped as the "control device".

Modification 2

Figure 15:
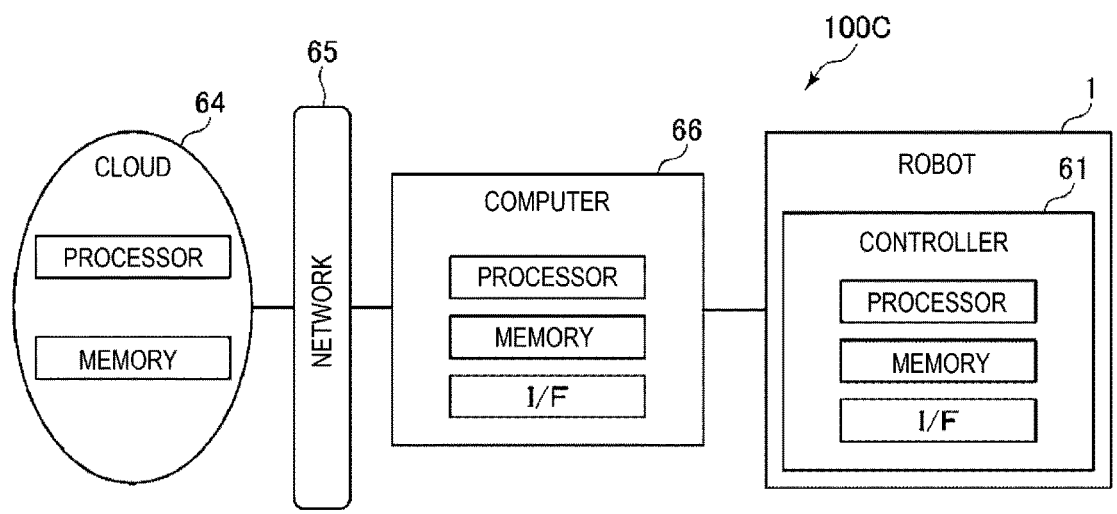
FIG. 15 is a block diagram showing a modification 2 centering on the hardware of the robot system.

FIG. 15 is a block diagram showing a modification 2 centering on hardware of a robot system.

In FIG. 15, an overall configuration of a robot system 100C in which the robot 1 incorporating the controller 61 and a computer 66 are coupled and the computer 66 is coupled to a cloud 64 via a network 65 such as a LAN is shown. Control of the robot 1 may be executed by a processor present in the computer 66 reading out a command present in a memory or may be executed, via the computer 66, by a processor present on the cloud 64 reading out a command present in a memory.

Therefore, any one, any two, or three of the controller 61, the computer 66, and the cloud 64 can be grasped as the "control device".

The control method and the robot system according to the present disclosure are explained above based on the illustrated embodiments. However, the present disclosure is not limited to this. The sections configuring the robot system can be replaced with sections having any configurations that can exert the same functions. Any components may be added.

What is claimed is:

1. A control method for a robot including a robot arm including an arm to which one of a plurality of end effectors is detachably attached, the robot arm being driven based on an operation program, and an encoder configured to detect motion of the robot arm, the control method comprising:
an acquiring step for acquiring information concerning the plurality of end effectors and acquiring the operation program; and
a driving step for driving the robot arm based on the operation program acquired in the acquiring step, wherein
in the driving step, speed of a speed estimation target part is calculated for each of the plurality of end effectors based on a detection result of the encoder, and
when it is determined that, in a result of the calculation, the highest speed of the speed estimation target part of the plurality of end effectors moving when the robot arm is driven by the operation program is equal to or higher than a predetermined speed, operating speed of the robot arm is reduced, and wherein in the acquiring step, a plurality of operation programs for different operations of the plurality of end effectors are acquired, and in the driving step, the highest speed of the speed estimation target parts of the plurality of end effectors is calculated for each of the plurality of operation programs and a result of the calculation and the predetermined speed are compared.

2. The control method according to claim 1, wherein the information concerning the plurality of end effectors includes information concerning shapes.

3. The control method according to claim 1, wherein the speed estimation target part is a portion most separated from the arm in a state in which one of the plurality of end effectors is attached to the arm or, when viewed from a center axis of the arm, a portion most separated from the center axis.

4. The control method according to claim 1, wherein the encoder is an encoder that detects a rotation angle of the arm.

5. The control method according to claim 1, further comprising a specifying step for specifying speed estimation target parts of the end effectors based on the information concerning the end effectors and the operation program.

6. A control method for a robot including a robot arm including an arm to which one of a plurality of end effectors is detachably attached, the robot arm being driven based on an operation program, and an encoder configured to detect motion of the robot arm, the control method comprising:

an acquiring step for acquiring information concerning the plurality of end effectors and acquiring the operation program;

a calculating step for calculating speed of a speed estimation target part for each of the plurality of end effectors based on the information acquired in the acquiring step and calculating, based on a detection result of the encoder, in a result of the calculation, the highest speed of the speed estimation target part of the plurality of end effectors moving at a time when the robot arm is driven by the operation program; and a driving step for driving the robot arm based on the operation program acquired in the acquiring step, and in the driving step, when it is determined that the calculation result is equal to or higher than a predetermined speed, operating speed of the robot arm is reduced, and wherein in the acquiring step, a plurality of operation programs for different operations of the plurality of end effectors are acquired, and in the driving step, the highest speed of the speed estimation target parts of the plurality of end effectors is calculated for each of the plurality of operation programs and a result of the calculation and the predetermined speed are compared.

7. A robot system comprising:

a robot arm including an arm to which one of a plurality of end effectors is detachably attached, the robot arm being driven based on an operation program;

an encoder configured to detect motion of the robot arm;

an input port configured to acquire information concerning the end effectors and acquire the operation program;

at least one first processor configured to calculate speed of a speed estimation target part for each of the plurality of end effectors based on the information acquired by the input port;

at least one second processor configured to drive the robot arm based on the operation program; and at least one third processor configured to calculate, when the robot arm is driven by the operation program, based on a detection result of the encoder, the highest speed of the speed estimation target part of the plurality of end effectors and compare a result of the calculation and a predetermined speed, wherein when the at least one third processor determines that the calculation result is equal to or higher than the predetermined speed, the at least one second processor reduces operating speed of the robot arm, and wherein a plurality of operation programs for different operations of the plurality of end effectors are acquired, and the highest speed of the speed estimation target parts of the plurality of end effectors is calculated for each of the plurality of operation programs and a result of the calculation and the predetermined speed are compared.

* * * * *